(No Model.)

J. R. McCALL.
REFRIGERATING BUTTER SAFE.

No. 259,699. Patented June 20, 1882.

Witnesses,
Edwin L. Yewell
H. Aubrey Toulmin

Inventor
J. R. McCall
By C. M. Alexander,
his Atty.

UNITED STATES PATENT OFFICE.

JAMES R. McCALL, OF SCHOOLCRAFT, MICHIGAN.

REFRIGERATING BUTTER-SAFE.

SPECIFICATION forming part of Letters Patent No. 259,699, dated June 20, 1882.

Application filed November 17, 1881. (No model.)

*To all whom it may concern:*

Be it known that I, JAMES R. MCCALL, of Schoolcraft, in the county of Kalamazoo, and in the State of Michigan, have invented certain new and useful Improvements in Refrigerating Butter-Safes; and I do hereby declare that the following is a full, clear, and exact description thereof, reference being had to the accompanying drawings, and to the letters of reference marked thereon, making a part of this specification.

This invention relates to certain improvements in apparatus for cooling milk and cream; and it has for its object to provide an apparatus whereby butter may be cooled and preserved at the same time as the milk or cream, as more fully hereinafter specified. This object I attain by the apparatus illustrated in the accompanying drawings, in which—

Figure 1:
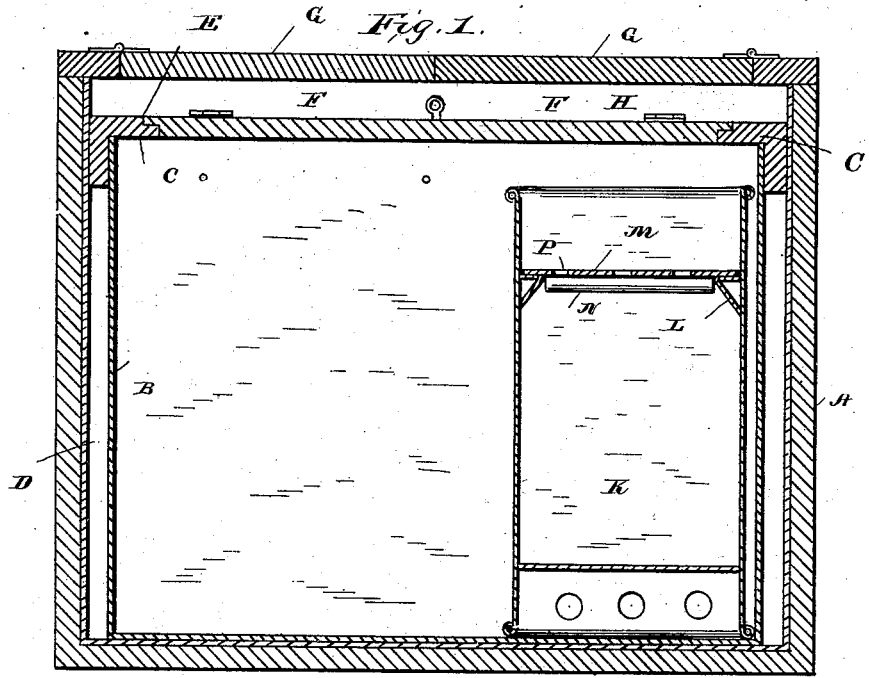
Figure 2:
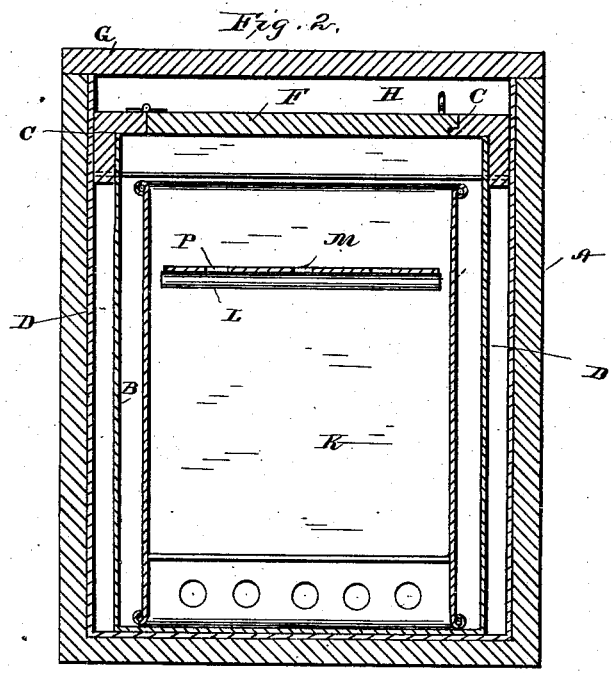

Figure 1 represents a longitudinal vertical section of the apparatus, showing my invention; and Fig. 2, a transverse vertical section of the same.

The letter A indicates a rectangular casing, of wood, constructed in the ordinary manner, and provided with a lining of paper, pasteboard, or other similar material.

The letter B indicates an internal casing, of metal, secured at the top to a horizontal frame, C, which is secured in the upper part of the outer casing. The two casings are of such relative size as to leave a space, D, between their walls, which is closed at the top by means of the frame C, before mentioned. The said frame is rabbeted, as indicated by the letter E, and is provided with a hinged top, F, by means of which the inner casing may be closed.

The letter G indicates a hinged top constructed in two parts and adapted to close the outer casing, leaving a dead-air space, H, between it and the top of the inner casing.

The letter K indicates the milk or cream vessel, which may be of the ordinary or any approved construction, and which is adapted to fit within the inner casing. One or more of said vessels may be located in the said inner casing, according to its capacity. The said vessel K, near its top, is provided with ledges L, upon which is adapted to rest a tray, M, for the reception of butter.

The tray may be provided with transverse strengthening-strips N below, and may be perforated, as indicated by the letter P, to permit a free circulation of air over the surface of the milk or cream. The inner casing is adapted to contain water, as usual, for cooling the milk or cream and the butter contained in the vessel K.

Having thus described my invention, what I claim, and desire to secure by Letters Patent, is—

The combination, with the inner and outer casings, constructed as described, of the vessel or vessels for containing milk or cream and the tray or trays located therein for containing butter, substantially as and for the purpose specified.

In testimony whereof I affix my signature, in presence of two witnesses, this 25th day of October, 1881.

JAMES R. McCALL.

Witnesses:
JAMES MAJOR,
J. S. SHUTES.